H. WEBER.
PRESSURE INDICATING DEVICE.
APPLICATION FILED JAN. 12, 1914.

1,206,782.

Patented Nov. 28, 1916.

Witnesses:
Pearl Putnam
L. C. Barkley

Inventor
Hans Weber,
by Frank Aukleman,
Attorney

UNITED STATES PATENT OFFICE.

HANS WEBER, OF SCHANZENBERG, ZURICH, SWITZERLAND.

PRESSURE-INDICATING DEVICE.

1,206,782.  Specification of Letters Patent.  Patented Nov. 28, 1916.

Application filed January 12, 1914. Serial No. 811,631.

*To all whom it may concern:*

Be it known that I, HANS WEBER, a citizen of the Swiss Republic, residing at Schanzenberg, Zurich, Switzerland, have invented certain new and useful Improvements in Pressure-Indicating Devices, of which the following is a specification.

This invention relates to an indicating device which is intended for indicating the pressure of a liquid or of a gaseous fluid under pressure contained in a space or chamber.

Figure 1:
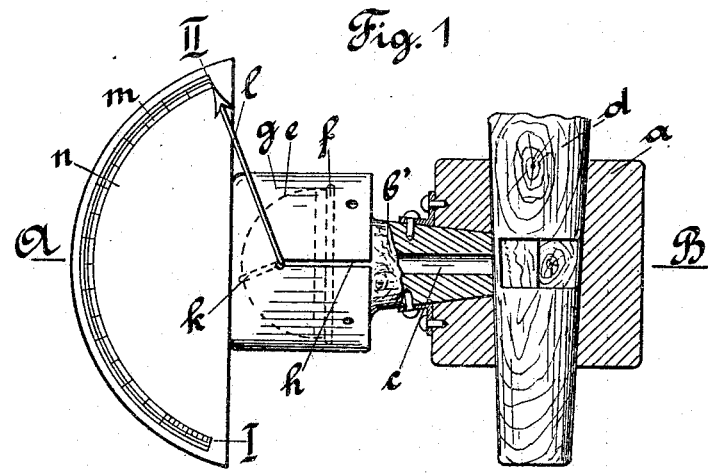
Figures 2, 7:
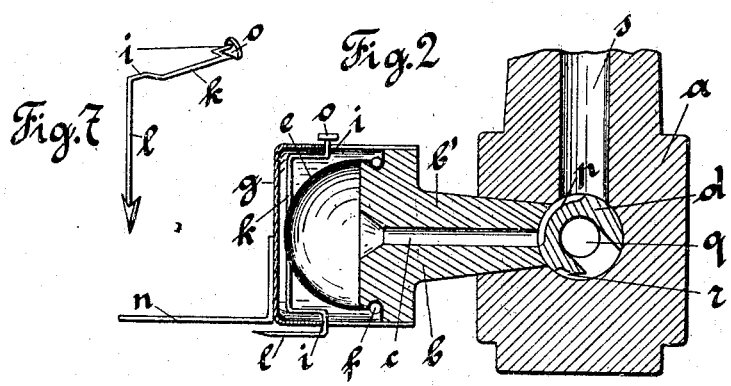
Figure 5:
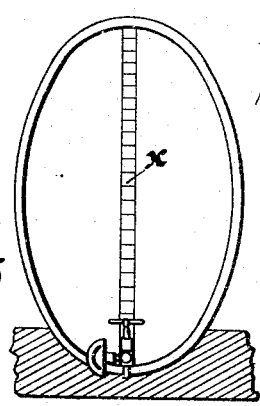
Figures 3, 4, 6:
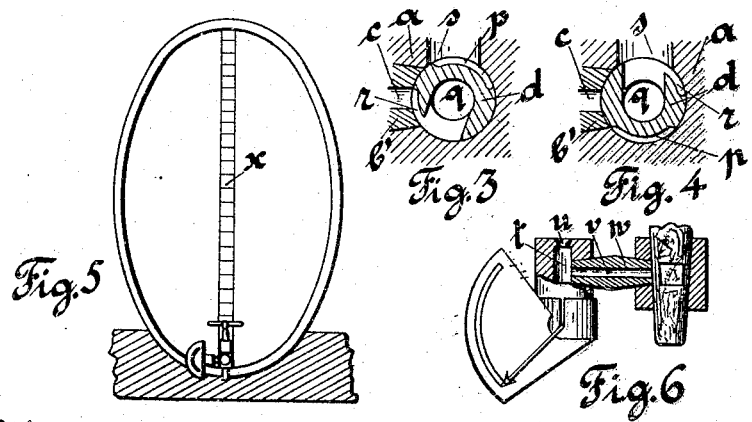

In the accompanying drawing, two forms of construction of the indicating device are illustrated, Figure 1 being a side elevation partly in section of one form of construction, Fig. 2 a section through the line A B in Fig. 1. Figs. 3 and 4 illustrate a detail. Fig. 5 is an end view of a vessel fitted with the indicating device. Fig. 6 a section partly in elevation of another form of construction. Fig. 7 a detail which is common to both forms of construction.

The indicating device is particularly suitable for use in indicating the quantity of liquid contained in casks, and in that case is arranged on the tap of the cask (see Fig. 5). This indicating device comprises a membrane and membrane support $b$ made of wood for example and formed with a conical plug $b^1$ adapted to fit in an aperture in the tap. A passage $c$ that communicates with the tap runs through the support and plug. The securing of the plug $b^1$ in its position is effected by means of two angular brackets, which are arranged on the plug $b^1$ and the tap $a$ (Fig. 1). The membrane support $b$ is covered by a membrane $e$ made of extensible material, for example, india-rubber, which is fixed by means of a string $f$ for example or the like which with the part of the membrane situated below it lies in a groove formed in the support. On the support a cover or casing $g$ formed of sheet metal and coming over the membrane is screwed by means of screws. This cover is formed with two diametrically oppositely situated slots $h$, in the limited end part of which the arm $i$ of a rectangularly bent wire is seated so that it can easily turn, this latter serving as pointer for indicating the pressure of the liquid contained in the interior of the cask. The portion $k$ of the arm $i$ which extends through the case $g$ forms the shaft for the indicator which moves with relation to the graduations on the scale $m$ arranged on the segment $n$ fixed to the cover $g$.

Normally the membrane $e$ lies flat on the front of the support $b$, the point of the pointer $l$ stands opposite the point I in the scale $m$ in consequence of the weight of the pointer and the action of an additional weight which is provided if necessary, but, if the device be subjected to the pressure of the liquid contained in the cask, the membrane expands and takes approximately the form indicated in Figs. 1 and 2, drives the piece $k$ before it and in this way causes the pointer $l$ to turn around the axis $i$ so that it points to the point II in the scale $m$ (Figs. 1 and 2).

The plug $d$ of the tap is furnished with three passages $p$ $q$ and $r$, by means of which through the turning of the plug communication can be established or cut off between the passage $c$ and the passage $s$ in the tap $a$ leading to the interior of the cask. In the position of the plug as shown in Figs. 1 and 2 the passages $c$ and $s$ communicate with one another. Both, however, are shut off from the external air. When the tap is in the position indicated in Fig. 3 the passage $c$ is opened, but the passage $s$ closed. Finally Fig. 4 represents a position of the plug of the tap in which the passage $c$ is closed but the passage $s$ on the contrary opened.

Instead of being placed in the side of a tap the device may be inserted directly in the side of the cask, in which case the membrane $e$ would be permanently under the influence of the liquid.

If for any reason it be desired to prevent direct contact between the membrane $e$ and the liquid introduced into the interior of the cask, the form of the invention as illustrated in Fig. 6 may be employed. This form differs from the first form in this respect, viz., that a fluid which will not intermix with that contained in the cask is poured into a passage $t$ the lower opening of which is closed by the extensible membrane, this fluid then lying constantly on the membrane. If the liquid in the cask, and which must be specifically lighter than that contained in the passage $t$ be now conveyed into the passage $t$, the liquid in the cask cannot act directly on the membrane, but the pressure thereof is transmitted to the membrane through the medium of the fluid with which the passage $t$ is filled. The liquid in the cask can in this form of the invention be conveyed to the passage $c$ through a passage $v$ that runs axially through a plug $w$ that is conically tapered at both ends and connects the tap with the indicating device.

On the cask, the quantity contained in which is to be indicated, a vertical scale $x$ (Fig. 5) may further be suitably arranged, from which the level of the liquid contained in the cask can be ascertained in accordance with the graduations to which the pointer of the indicating device is adjusted.

What I claim and desire to secure by Letters Patent is:—

1. A pressure indicator comprising a tap having communicating openings, a plug in each of the openings, one of the plugs adapted to control the flow of fluid through the tap, the other plug having an annular groove in one end thereof, a membrane of expansible material positioned over the end of the plug having the annular groove, means engaging the membrane for holding a portion thereof within the annular groove, a scale rotated by said other plug, an indicator coöperating with the scale, means for connecting the membrane and indicator, whereby movement of the membrane causes a relative movement of the indicator over the scale.

2. A pressure indicator comprising a tap having communicating openings, a fluid controlling plug in one of the openings, a plug in the other opening, an expansible membrane positioned on one end of the second plug to form a chamber therewith, an indicator sensitive to movement of the membrane, a housing carrying a graduated member, and adapted to support the indicator, said housing adapted to substantially house the end of the plug carrying the membrane, said housing having slots for accommodating portions of the indicator to allow the indicator to move longitudinally of the sides of the housing when the openings in the fluid controlling plug are in registry to allow fluid to flow to the membrane, thereby producing a relative movement of the indicator.

3. A pressure indicator comprising a tap having communicating openings, a fluid controlling plug in one of the openings, a plug, a membrane on one end thereof forming a chamber between the plug and membrane, said plug being positioned in the other opening, said fluid controlling plug adapted to control the flow of fluid to the membrane chamber, a casing inclosing a membrane, an indicator in engagement with the membrane, and being supported within slots formed in the casing, whereby the indicator is moved when fluid contacts with and moves the membrane, substantially as described.

In testimony whereof I have affixed my signature, in presence of two witnesses.

HANS WEBER.

Witnesses:
HERMANN ARENSBERG,
REINHOLD STOUPEL.

Copies of this patent may be obtained for five cents each, by addressing the "Commissioner of Patents, Washington, D. C."